United States Patent
Krusanov et al.

(10) Patent No.: US 10,838,078 B2
(45) Date of Patent: Nov. 17, 2020

(54) METHOD FOR SEARCHING FOR AND DETECTING GAMMA RADIATION SOURCES

(71) Applicant: STATE ATOMIC ENERGY CORPORATION "ROSATOM" ON BEHALF OF THE RUSSIAN FEDERATION, Moscow (RU)

(72) Inventors: Victor Sergeevich Krusanov, Moscow (RU); Oleg Nikolaevich Romanov, Moscow (RU)

(73) Assignee: STATE ATOMIC ENERGY CORPORATION "ROSATOM"ON BEHALF OF THE RUSSIAN FEDERATION, Moscow (RU)

( * ) Notice: Subject to any disclaimer, the term of this patent is extended or adjusted under 35 U.S.C. 154(b) by 0 days.

(21) Appl. No.: 16/467,815

(22) PCT Filed: Oct. 26, 2017

(86) PCT No.: PCT/RU2017/000785
§ 371 (c)(1),
(2) Date: Jun. 7, 2019

(87) PCT Pub. No.: WO2018/106144
PCT Pub. Date: Jun. 14, 2018

(65) Prior Publication Data
US 2020/0142080 A1    May 7, 2020

(30) Foreign Application Priority Data
Dec. 9, 2016 (RU) .................. 2016148582

(51) Int. Cl.
*G01T 1/167* (2006.01)
*G01C 3/08* (2006.01)
*G01T 1/169* (2006.01)

(52) U.S. Cl.
CPC ................ *G01T 1/167* (2013.01); *G01C 3/08* (2013.01); *G01T 1/169* (2013.01)

(58) Field of Classification Search
CPC ........... G01T 1/167; G01T 1/169; G01C 3/08; G01C 3/00; G01S 7/497; G01S 17/88; G01S 17/86
See application file for complete search history.

(56) References Cited

U.S. PATENT DOCUMENTS

| | | | |
|---|---|---|---|
| 5,286,973 A | 2/1994 | Westrom et al. | |
| 6,596,998 B1 * | 7/2003 | Siedel | G21C 17/108 250/254 |

(Continued)

FOREIGN PATENT DOCUMENTS

| | | |
|---|---|---|
| JP | 2014185967 A | 10/2014 |
| RU | 2068571 C1 | 10/1996 |

(Continued)

OTHER PUBLICATIONS

International Search Report of corresponding international PCT application No. PCT/RU2017/000785, dated Jan. 25, 2018, 1 page.

(Continued)

*Primary Examiner* — Marcus H Taningco
(74) *Attorney, Agent, or Firm* — Brooks Kushman P.C.

(57) ABSTRACT

A method for searching for and detecting gamma radiation sources in conditions of nonuniform radioactive contamination is provided. Stages in which a source of maximally active radiation is determined, the radiation power is measured with a collimated detector and at the same time the distance to the source is determined with the aid of a laser detector rangefinder. Readings of the laser rangefinder and the value of a dose rate are established by the detector are recorded. The dose rate of the radiation of the actual source is calculated, after which, to verify the distance measured to the radiation source, the aiming axis of the rangefinder is (Continued)

moved for a distance horizontally. The measurement is repeated and the distance recorded. The results of successive measurements of the distance are compared. If there is a divergence in the measurements within the laser rangefinder error limits, the information is acknowledged as reliable.

4 Claims, 1 Drawing Sheet

(56) References Cited

U.S. PATENT DOCUMENTS

| 2002/0117627 | A1* | 8/2002 | Jimbo | G01T 7/00 250/370.13 |
|---|---|---|---|---|
| 2003/0111612 | A1* | 6/2003 | Lightfoot | G01T 7/00 250/394 |
| 2014/0085481 | A1* | 3/2014 | Takahashi | H04N 5/30 348/162 |
| 2014/0299784 | A1* | 10/2014 | Kobayashi | G01T 1/1648 250/394 |

FOREIGN PATENT DOCUMENTS

| RU | 2195005 C2 | 12/2002 |
|---|---|---|
| RU | 2195006 C2 | 12/2002 |
| RU | 27716 U1 | 2/2003 |
| RU | 82871 U1 | 5/2009 |

OTHER PUBLICATIONS

International Search Report of corresponding international PCT application No. PCT/RU2017/000785, dated Jan. 25, 2018, 3 pages, in Russian.

Written Opinion of corresponding international PCT application No. PCT/RU2017/000785, dated Jan. 25, 2018, 4 pages, in Russian.

* cited by examiner

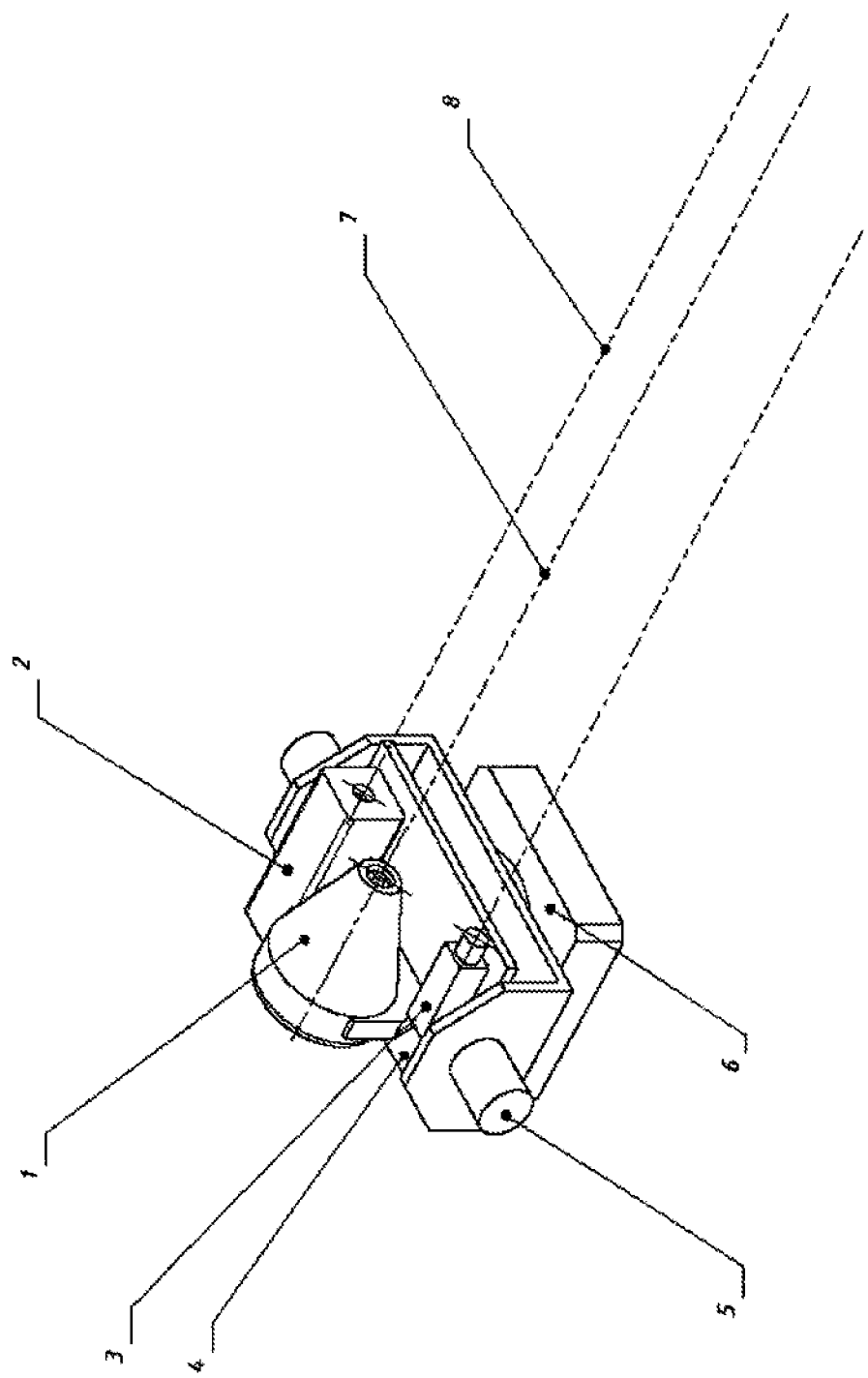

METHOD FOR SEARCHING FOR AND DETECTING GAMMA RADIATION SOURCES

CROSS-REFERENCE TO RELATED APPLICATIONS

This application is the U.S. national phase of PCT Application No. PCT/RU2017/000785 filed on Oct. 26, 2017, which claims priority to Russian Patent Application No. RU 2016148582 filed on Dec. 9, 2016, the disclosures of which are incorporated in their entirety by reference herein.

FIELD OF THE INVENTION

The invention relates to the field of radiation monitoring, and more specifically to a method for searching for and detecting gamma radiation sources. It is designed for remedying the consequences of radiation incidents using remotely operated robotic systems, and allows unmanned emergency operations to be carried out in areas contaminated by radiation.

BACKGROUND OF THE INVENTION

A method for remote detection of nuclear charges is known, including determination of the intensity of gamma radiation flow in the range of 1.5-2.0 MeV near the object of interest, followed by further determination of the intensity of gamma radiation flow at about 10.83 MeV, determination of background radiation within specified intervals, determination of the relationship between the values measured, and use of the appropriate inequality to detect the presence of a charge. RF Patent No. 2068571, IPC G01T 1/29, Oct. 27, 1996.

The method allows the presence or absence of nuclear charges inside the object of interest to be determined when carrying out measurements in close vicinity to the object, but it does not allow the location of a source in an open area or the radiation power of a source distant from a measuring unit to be determined; this is one of the factors militating against the use of this method.

A method for remote detection of radioactive objects is known, including determination of the distance to a source of radiation and of its radiation monitoring characteristics by measuring the relationship between photon emission intensities at radionuclide energy lines weakened by a layer of an absorbent medium. This method allows the distance to a radiation source and the radiation monitoring characteristics of the source to be determined. RF Patent No. 2195006, IPC G01T 1/169, Dec. 20, 2002.

Drawbacks of this method might include the low accuracy with which the direction of a detected source is determined, and the dependence of the results of measurements on a change of properties in the absorbent medium.

A method for searching for and detecting gamma radiation sources in conditions of nonuniform radioactive contamination is known, consisting of the recording of radiation by several detectors installed on a mobile robot (MR) platform in order to detect a source in conditions of uneven distribution of radioactive contamination across an area. For this purpose, signals from the first and the second detectors, which are separated by a screen, are recorded. The signals are equalized by turning the longitudinal axis of the MR towards the area where radiation is more intense. The MR is moved in the specified direction until the signals from these detectors begin to vary. A signal from the third detector is recorded, generated by an increase in the dose rate when the gamma radiation source is approached, and these operations are repeated until receipt of a signal from the third detector showing a decreased dose rate, indicating detection of the source location. RF Patent No. 2195005, IPC G01T 1/169, Dec. 20, 2002. This technical solution is accepted as a prototype.

One of the drawbacks of this method is that it does not allow the radiation power of a remote source to be determined. Installation of radiation detectors on the body of a robotic system vehicle allows the direction of the source location to be determined, but not its specific location on the ground.

SUMMARY OF THE INVENTION

A method for searching for and detecting gamma radiation sources using a mobile robot in conditions of nonuniform radioactive contamination, comprising detection of a source of radiation; measurement of the radiation dose rate; and recording of the value established by the detector by pointing the aiming axes of the detectors, which are installed on a mobile robot platform, one after another at a source of radiation. A source with a maximally high level of radiation is determined, the radiation power is measured with a collimated detector, and the distance to the source is simultaneously determined with the aid of a laser detector rangefinder, wherein the axes of the collimated detector and the laser rangefinder are aimed in parallel and set apart horizontally, readings of the laser rangefinder and the value of the dose rate established by the detector are recorded, and, on the basis of these data, the dose rate of the radiation from the actual source is calculated, after which, in order to verify the accuracy of the distance measured to the radiation source, the aiming axis of the rangefinder is moved a certain distance horizontally, the measurement is repeated and the distance recorded, the results of successive measurements of the distance are compared and, in the event of a discrepancy in the measurements within the laser rangefinder error limits, the information is taken as reliable. In the event of a discrepancy in the measurements exceeding the laser rangefinder error limits, the results of the measurements are passed to the operator in order for the causes of the discrepancy between the results to be determined visually. For this purpose, a TV camera installed on a mobile platform or a mobile robot is used. The results of the measurements are processed using a software program.

The objective of the creation of the present invention was to improve the reliability (validity) of the results of measurements taken in the process of searching for sources of radiation by excluding accidental errors.

Technical Result

The technical result consists in increasing the accuracy with which the distance to a source is measured irrespective of the properties of the absorbent medium, and, as a consequence, complete exclusion of erroneous measurements of the power of a remote source as a result of incorrect measurement of the distance to the source.

BRIEF DESCRIPTION OF DRAWINGS

The drawing contains a diagram of the installation on a mobile robot of the remotely operated process equipment intended for implementation of the method for remedying the consequences of radiation incidents, wherein:

1 is a collimated gamma radiation detector;
2 is a laser rangefinder;
3 is a radiation-resistant TV camera;
4 is a platform;
5 is a platform swivel drive;
6 is a platform rotation drive;
7 is an axis of measurement of gamma radiation power;
8 is an axis of measurement of distance to an object.

EMBODIMENT

The method is implemented as follows.

Operation begins with the determination of a source with maximally high radiation. For this purpose, the area of interest is artificially divided into rectangular areas with dimensions which do not exceed the solid angle of the collimated detector; gamma radiation power in each area is measured by means of the MR drives (5) or pan and tilt drives (6) of the collimated detector (1). For this purpose, the gamma radiation power is measured with a collimated detector (1) along the axis (7); at the same time, the distance to the source is determined with the aid of a laser detector rangefinder (2) along the axis (8). The collimated gamma radiation detector (1) measures gamma radiation power in the narrow solid angle (about 1.5-2 degrees) along the axis (7), which allows the equipment to be aimed accurately at the source and sources located close to one another to be distinguished. To make these measurements, the axes of the detectors (1 and 2) are aimed in parallel to one another, but spaced a certain distance from each other horizontally, after which readings from the laser rangefinder (2) and the value of the dose rate established by the collimated detector (1) are recorded.

The source power is calculated by an onboard computing unit as the inverse square of the distance from the radiation source to the collimated gamma radiation detector (1). If foreign objects unrelated to the source of interest appear on the distance measurement axis (8), the power of the source may be calculated incorrectly due to incorrect data on the distance to the source. In order to exclude erroneous measurements and to verify the accuracy of the measured distance to the radiation source, the aiming axis (8) of the rangefinder (2) is moved a certain distance horizontally, the measurements are repeated, and the results are recorded. The data obtained as a result of successive measurements of the distance are compared and, in the event of a discrepancy in the measurements within the laser rangefinder (2) error limits, the information is taken as reliable.

In the event of a discrepancy in the measurements exceeding the laser rangefinder (2) error limits, the results of the measurements are passed to the operator in order for the causes of the discrepancy between the results to be visually determined, for which a radiation-resistant TV camera (3) installed on a mobile platform (4) or a mobile robot is used.

The proposed method was tested at the test site (the town of Zelenograd with $^{60}$Co gamma radiation sources.

The level of contamination and gamma radiation of the sources in question at which this method can be used depends mainly on the directivity coefficient (or protection) and load capacity of the collimated detector.

The distance between the axis of the collimated detector and the axis of the laser rangefinder depends on the materials used and on the design of these devices. During the tests, the following spacing distances were used: 80 mm, 100 mm, 120 mm.

The measurements were carried out in rooms with a comparatively low background radiation level and in a special basement where the background radiation level was below 8 R/h.

Pipelines with diameters comparable to the distance between the horizontally-spaced parallel rays (65-200 mm) were installed in the basement. A situation was observed whereby a laser ray was reflected by the pipelines and a point source was situated far beyond the pipelines (an optical obstacle) or vice versa. This situation is typical for the cluttered production premises in which accidents happen. Power was measured and distance to the source was determined at the site (with parallel rays spaced horizontally at a distance of 100 mm). The dose rate of the actual source was calculated based on these data. Then, in order to verify the accuracy of the distance measured, the aiming axis of the rangefinder was moved by 100 mm (the horizontal distance between the rays), the measurement was repeated and the distance recorded.

The results were compared. If there was no discrepancy in the measurements, the information was taken as reliable.

As the dose rate is calculated using the square of the distance to the radiation source, an error in determining the distance by a factor of 2 will inevitably mean the dose rate is out by a factor of 4, mismeasuring the distance by a factor of 3 will throw the dose rate out by a factor of 9, and so forth.

In the event of a discrepancy in the measurement results, the operator evaluated the situation using a TV camera installed on a mobile platform. The measurements were then repeated from another observation point in order to exclude the optical obstacle.

Previously, when measurements were carried out upon detection of a source of radiation without application of the proposed method, in questionable cases (if objects were distributed across the area of interest), the measurements had to be repeated from other observation points, which was not always possible due to the geometry and cluttered condition of the sites.

Comparison of the results obtained remotely in accordance with the proposed method with the results of direct measurements demonstrated a perfect match between the coordinates of the "hot spots" revealed.

Doubtful results can occur when carrying out quite distant measurements, when the pixel resolution of a TV camera can be insufficient for accurate compensation of a shift between rays. Specific values depend on the quality of the TV camera (resolution, zoom etc.) and the processing hardware. The hardware used allowed a shift to be compensated at distances up to 8-10 meters.

During the tests of the proposed method at the enterprise test site, using a calibration radioactive source in conditions similar to real-life conditions, no erroneous measurements of the power of a remote source were recorded.

Therefore, tests of the method fully proved achievement of the abovementioned technical result, namely, a significant increase in the accuracy with which the distance to a source is measured, irrespective of the properties of the absorbent medium, and, as a consequence, complete exclusion of erroneous measurements of the power of a remote source as a result of incorrect measurement of the distance to the source.

The invention claimed is:

1. A method for searching for and detecting gamma radiation sources in conditions of nonuniform radioactive contamination, comprising:

detection of a source of radiation, measurement of the radiation dose rate, and recording of the value established by the detector by pointing the aiming axes of the detectors, which are installed on a platform, one after another at a source of radiation, wherein a source with a maximally high level of radiation is determined, the radiation power is measured with a collimated detector, and the distance to the source is simultaneously determined with the aid of a laser detector rangefinder, wherein the axes of the collimated detector and the laser rangefinder are aimed in parallel and set apart horizontally, readings of the laser rangefinder and the value of the dose rate established by the detector are recorded, and, on the basis of these data, the dose rate of the radiation from the actual source is recorded, after which, in order to verify the accuracy of the distance measured to the radiation source, the aiming axis of the rangefinder is moved a certain distance horizontally, the measurement is repeated and the distance recorded, the results of successive measurements of the distance are compared and, in the event of a discrepancy in the measurements within the laser rangefinder error limits, the information is taken as reliable.

2. The method of claim 1, wherein in the event of a discrepancy in the measurements exceeding the laser rangefinder error limits, the results of measurements are provided to the operator in order for the causes of the discrepancy between the results to be determined visually.

3. The method of claim 1, wherein a TV camera installed on a mobile platform or a mobile robot is used.

4. The method of claim 1, wherein the results of measurements are processed using a software program.

\* \* \* \* \*